United States Patent

Jäfverström

[11] Patent Number: 5,968,229
[45] Date of Patent: Oct. 19, 1999

[54] PURIFICATION OF METAL CONTAINING SOLUTIONS

[75] Inventor: Stefan Jäfverström, Örebro, Sweden

[73] Assignee: Kemira Kemi AB, Helsingborg, Sweden

[21] Appl. No.: 08/894,925

[22] PCT Filed: Mar. 1, 1996

[86] PCT No.: PCT/SE96/00264

§ 371 Date: Sep. 3, 1997

§ 102(e) Date: Sep. 3, 1997

[87] PCT Pub. No.: WO96/27556

PCT Pub. Date: Sep. 12, 1996

[30] Foreign Application Priority Data

Mar. 3, 1995 [SE] Sweden .................................. 9500775

[51] Int. Cl.$^6$ ........................................................ C01G 9/00
[52] U.S. Cl. ................................ 75/710; 75/710; 75/392; 148/513; 210/702; 210/663
[58] Field of Search .......................... 75/710, 392, 10.67, 75/109; 210/702, 663; 23/305 F; 423/138, 140; 148/513

[56] References Cited

U.S. PATENT DOCUMENTS 3,617,562  11/1971  Cywin et al. ............................. 210/48
3,800,024  3/1974   Forsell et al. ............................. 423/55
3,801,481  4/1974   Eddleman ................................. 204/149
3,931,007  1/1976   Sugano et al. ............................ 210/50

FOREIGN PATENT DOCUMENTS 0 141 313 A1  5/1985  European Pat. Off. .
1 621577      7/1971  Germany .

Primary Examiner—Patrick Ryan
Assistant Examiner—M. Alexandra Elve
Attorney, Agent, or Firm—Birch, Stewart, Kolasch & Birch, LLP

[57] ABSTRACT

A process for the purification of solutions containing metals comprising neutralization of the solution, reduction of Fe(III) present, and elimination of ingoing dissolved zinc, whereby the ingoing solution containing metals is neutralized using magnetite and/or metallic iron, that the ingoing iron (III) is reduced to iron (II) by means of an addition of metallic iron, that ingoing heavy metals are precipitated by the addition of a precipitating amount of a sulphide, whereby the metal sulphides precipitated are recovered by means of filtration, that the solution is, optionally, subjected to an ion exchange operation to transfer ingoing zinc into non-complex bound form, whereupon zinc is recovered as zinc carbonate, that iron (II) in the remaining solution is oxidized to iron (III), whereupon the solution is used as such or is further treated for increasing the metal content for the purpose intended.

8 Claims, No Drawings

PURIFICATION OF METAL CONTAINING SOLUTIONS

TECHNICAL FIELD

The present invention relates to a process for the purification of metal containing solutions, in particular pickling solutions containing iron and zinc.

The object of the present invention is to obtain a process to recover metal compounds from spent solutions containing metal salts, and then in particular zinc and iron salts from spent pickling baths.

BACKGROUND OF THE INVENTION

In connection with surface treatment of metallic objects these are pickled in acidic baths, whereby in particular hydrochloric acid is generally used, in order to provide the metal object with a clean surface to which the surface treatment adheres. Hereby metal and metal oxides are dissolved from the metallic objects, which metal will be found in the pickling solutions in the form of ions, which can be recovered in the form of salts of different kinds. Most of all pickling solutions containing iron, aluminium, and zinc are present, which pickling solutions are a great problem as they can not be deposited in any arbitrary way as the metals present can create an environmental problem. Furthermore, the metals present are a resource if they should be able to be recovered.

EP-A1-0 141 313 discloses a process for recovering iron and zinc from spent pickling solutions, whereby the pickling solution is first treated with an absorption agent to eliminate any organic material present, whereupon the iron present in three valence form is first reduced using metallic iron and zinc, to two valence form, the zinc present is extracted using a complex forming solvent, whereupon zinc and iron are recovered in a traditional way. The addition of zinc is carried out in a step following the addition of metallic iron in order to precipitate heavy metals present by means of a cementation. In connection with the cementation zinc will dissolve and can then be recovered as zinc chloride. When the zinc chloride has been eliminated by means of extraction iron can be recovered as a solution of iron(III) chloride after oxidation of the two valence iron. The process is hereby based on a cementation of the heavy metals present and a solvent extraction of the zinc present by means of trioctyl amine in a mixture with kerosine/isodecanol. The use of the organic solvent is a complication as these have to be recovered, partly for cost reasons, partly for environmental reasons.

There is thus a desire for a more simplified and cost efficient process for recovering the metals present, and in particular to eliminate the need for organic solvents.

DESCRIPTION OF THE PRESENT INVENTION

It has now surprisingly been found possible to meet these requirements by means of the present invention which is characterized in that the ingoing solution containing metals is neutralized using magnetite and/or metallic iron, that the ingoing iron (III) is reduced to iron(II) by means of an addition of metallic iron, that ingoing heavy metals are precipitated by the addition of a precipitating amount of a sulphide, whereby the metal sulphides precipitated are recovered by means of filtration, that the solution is, optionally, subjected to ion exchange operation to transfer ingoing zinc into non-complex bound form, whereupon zinc is recovered as zinc carbonate, that iron(II) in the remaining solution is oxidized to iron(III), whereupon the solution is used as such or is further treated for increasing the metal content for the purpose intended.

Further characteristics are evident from the accompanying claims.

By means of the present invention it is obtained that many types of spent metal containing solutions can be recovered such as pickling baths containing hydrochloric acid, and sulphuric acid, other liquid effluent streams, solid disposals (materials dissolved in acid (scrap, oxides, hydroxides, etc.), as well as purification of iron(II) sulphate which is a large source of iron, and which is obtained as a residual product from other processes, such as the production of titanium; free acid in the ingoing baths can easily be neutralized using different sources of iron, whereby, by using different oxides, the hydrogen production is eliminated; optional unbalanced charges of the ingoing solution can be adjusted in a simple way before treatment; the source of sulphide can be varied in a simple way depending upon the local conditions; Zn ion exchange can be carried out either prior to or after the precipitation of the sulphides, which increases the flexibility of the process, whereby it should be noted that when chloride based solutions are not present, Zn can be precipitated as sulphide; the waste material generated by the process is present as a hydroxide-sulphide sludge, which is more easily taken care of than pure hydroxide sludges; Zn which is recovered as a zinc carbonate is a valuable product.

The process of the present invention is carried out in accordance with the following: An ingoing pickling bath containing iron and zinc, whereby the iron can be present in partly two valence form, partly three valence form, is neutralized depending on its zinc content in two different ways, viz., if the zinc content is low, first by using magnetite, whereby the acid present is neutralized, and one obtains an iron(III) chloride or sulphate depending on the composition of the ingoing pickling bath, whereupon the iron(III) content of the solution is reduced by adding metallic iron, which reduction is of importance for the subsequent working-up of the solution. If the zinc content is high a neutralization is carried out directly using metallic iron. Then, independent of the zinc content, there is a further neutralization using hydroxide or carbonate, to about pH 4.5 in order to achieve optimal conditions for the subsequent sulphide precipitation, which is carried out using sodium sulphide, sodium hydrogen sulphide or another sulphide source such as given above. At the addition of sulphide the ingoing heavy metals are precipitated, and then in particular Cu, Ni, Pb, Cr, and Co. The sulphide precipitation is optimal at 50–60° C. Then a filtration is carried out to eliminate sulphides precipitated, whereby the ingoing hydroxides are eliminated as well. The solution, now being substantially freed from said heavy metals is allowed to pass a Zn ion exchanger where the ingoing Zn ions in complex form present in the solution are eliminated and are obtained in a raffinate stream which is treated per se in accordance with below. The solution now substantially containing iron(II) ions is subject to an oxidation by means of chlorine or oxygen. At the oxidation using oxygen pH is suitably adjusted by means of an addition of sulphuric acid. Oxidation using chlorine is normally carried out when one has a chloride containing solution. The iron (III) containing solution thus obtained has usually too low an iron(III) content to be used as sewage water treatment agent as end use, and thus further a iron(III) compound is added to reach a suitable concentration for the user, viz. about 12% Fe(III). The addition of further iron can be done by adding "copperas", i.e. iron(II) sulphate heptahydrate, as well, which is dissolved and participates in the oxidation process.

Ingoing chemical reactions are the following:

1. Removal of free acid (neutralization):

A) Magnetite: $Fe_2O_3 + 6HCl = 2FeCl_3 + 3H_2O$ $FeO + 2HCl = FeCl_2 + H_2O$

B) Fe-metal: $Fe + 2HCl = FeCl_2 + H_2$

2. Ferri-reduction

Fe-metal $2Fe^{3+} + Fe = 3Fe^{2+}$

3. Sulphide precipitation
   A) Neutralization: $Cr^{3+} + 3OH^- = Cr(OH)_3$
   B) Metal sulphides: $Pb^{2+} + S^{2-} = PbS$
4. Oxidation
   A) using chlorine: $2FeCl_2 + Cl_2 = 2FeCl_3$
   B) using oxygen: $2FeSO_4 + 0,5O_2 + H_2SO_4 = Fe_2(SO_4)_3 + H_2O$ The zinc containing raffinate from the ion exchanger is precipitated in two separate steps using an intermediate filtration. Primarily, sodium carbonate is added to raise pH to about 5, whereby ferri hydroxide is precipitated and is separated (in the case the zinc ion exchanger preceeds the sulphide precipitation), whereafter further sodium carbonate is added until zinc carbonate is precipitated which occurs at about pH 8.5. Zinc carbonate is filtered off, whereby a zinc carbonate is obtained having the following typical composition: >95% Zn-carbonate, <5% Fe-carbonate. Further, there are trace elements present: Cr 15 mg/kg; Cu 5 mg/kg; Mn 140 mg/kg; Co <1 mg/kg; Ni 15 mg/kg; Pb 50 mg/kg; och Cd <1 mg/kg.

Iron(II) sulphate heptahydrate can be purified in accordance with the present invention whereby the iron(II) sulphate heptahydrate crystals are first dissolved in an aquoeus solution at 60° C. where the dissolution maximum is at hand. Hereby, a iron(II) sulphate solution having 10 to 11% of iron. The process is run in accordance with the above at 60° C. all the time in order to maximize the concentration.

However, the product solution need not be run through a Zn ion exchanger as no chloride system is present, but only a sulphate system. When the sulphide precipitation has been carried out the temperature is lowered to 15 to 20° C. i.e ambient temperature, pure iron(II) sulphate heptahydrate crystals being precipitated.

The present process does not require any substantial addition of energy, but the ingoing reactions can be carried out at 10 to 80° C. abd thereby in general at ambient temperature, with the exception of the purification of iron(II) sulphate hepta hydrate in accordance with the above, where one runs the process at 60° C. for reasons of optimization.

Below the results of a series of runs using the present process follow:

EXAMPLE 1

Pickling Bath (HCl) Having a Low Concentration of Zn

| Reduction of acid | magnetite | 30 g/1000 g of pickling bath |
|---|---|---|
| Ferri reduction | Iron powder | 10 g/1000 g of pickling bath |
| Neutralization | NaOH | --> pH 4,5 |
| $S^{2-}$ precipitation | $Na_2S$ (60% $Na_2S$) | 4 g/1000 g of pickling bath |
| Zn ion exchange | Amberlite IRA 420 | |

| | FE g/l | HCl g/l | Cu ppm | Ni ppm | Pb ppm | Cr ppm | Co ppm | Zn ppm | Mn ppm |
|---|---|---|---|---|---|---|---|---|---|
| Pickling bath in | 111 | 50 | 5 | 31 | 1170 | 325 | 4 | 128 | 788 |
| After neutr. | 149 | 0 | 3 | 32 | 1162 | 2 | 5 | 130 | 862 |
| After $S^{2-}$ precipita. | 151 | 0 | <1 | <1 | 4 | <1 | <1 | 130 | 910 |
| After Zn ion exch. | 150 | 0 | <1 | <1 | 2 | <1 | <1 | 2 | 900 |

EXAMPLE 2

Pickling Bath (HCl) Having a High Concentration of Zn

| Reduction of acid | iron powder | |
|---|---|---|
| Ferri-reduction | iron powder | |
| Zn ion exchange | Purolite A500 | |
| Neutralization | NaOH | --> pH 4,5 |
| $S^{2-}$ precipitation | Sulphide sol. (5% $Na_2S$, 8% NaHS, 10% $Na_2CO_3$) | |

| | Fe g/l | HCl g/l | Cu ppm | Ni ppm | Pb ppm | Cr ppm | Co ppm | Zn ppm | Mn ppm |
|---|---|---|---|---|---|---|---|---|---|
| Pickling bath in | 135 | 30 | — | 42 | 200 | 59 | 4 | 3012 | 740 |
| After neutr. | 190 | 0 | — | 66 | 206 | 78 | 5 | 2992 | 740 |
| After $S^{2-}$ precipita. | 190 | 0 | — | 66 | 206 | 78 | 5 | <10 | 740 |
| After Zn ion exch. | 150 | 0 | — | <1 | 2 | <1 | <1 | <10 | 740 |

The solution purified can suitably be used for the purification of sewage water where the contents of ferri chloride is a flocculating agent for suspended and colloidal materials present in the sewage water.

I claim:

1. A process for the purification of metal-containing solutions which contain iron salts and zinc salts, comprising:

(a) adding magnetite and/or metallic iron to said metal-containing solution thereby neutralizing free acid;

(b) adding a precipitating amount of sulphide to precipitate heavy metals;

(c) filtering the solution to recover the precipitated heavy metals; and (d) oxidizing the iron(II) to iron(III) in the remaining solution.

2. Process according to claim 1, wherein the process is carried out at a temperature of 10 to 80° C.

3. Process according to claim 1 or 2, wherein crystals of iron (II) sulphate heptahydrate are used as a starting material of the metal containing solution.

4. Process according to claim 3, wherein the process is carried out at 60° C.

5. Process according to claim 1, wherein iron (11) sulphate heptahydrate is added in step (f) in order to increase the iron of the solution.

6. The process according to claim 1 further comprising after step (d);

(e) adding metals to the solution to increase metal content.

7. The process according to claim 1 further comprising after step (c);

recovering zinc from the filtered solution by an ion exchange operation with an ion exchanger and recovering the zinc from the ion exchanger by precipitation as zinc carbonate at about pH 8.5.

8. The process according to claim 1 further comprising after step (a);

adjusting the pH to about 4.5.

* * * * *